Oct. 18, 1955 S. N. BUCHANAN Re. 24,074

ELECTRIC CONNECTOR

Original Filed May 22, 1948 2 Sheets-Sheet 1

INVENTOR.
Stephen N. Buchanan
BY Arthur J. Darby
ATTORNEY.

ELECTRIC CONNECTOR

Original Filed May 22, 1948 2 Sheets-Sheet 2

INVENTOR.
Stephen N. Buchanan
BY Arthur J. Ponsley
ATTORNEY.

United States Patent Office

Re. 24,074
Reissued Oct. 18, 1955

24,074

ELECTRIC CONNECTOR

Stephen N. Buchanan, Westmoreland Hills, Md., assignor to Buchanan Electrical Products Corporation, Elizabeth, N. J., a corporation of New Jersey Original No. 2,560,683, dated July 17, 1951, Serial No. 28,566, May 22, 1948. Application for reissue July 14, 1952, Serial No. 298,883

8 Claims. (Cl. 174—87)

Matter enclosed in heavy brackets [ ] appears in the original patent but forms no part of this reissue specification; matter printed in italics indicates the additions made by reissue.

This is a continuation-in-part of my application Serial Number 744,077, filed April 26, 1947, now abandoned.

This invention relates to an electrical connector and more particularly to a means for connecting two conductor ends together and providing an electrical connection with adequate insulation. In connecting electrical units such as ceiling lights and other devices, it is frequently necessary to connect two conductors together. It has been the usual practice to bare the ends of the conductors by removing the insulation, then to twist the two bared ends of the conductors together. To insure a good connection it has been generally considered necessary to solder the conductors together. After the conductors have been connected, they must be insulated and this generally has been accomplished by wrapping a rubber tape over the conductors and then wrapping a friction tape over the rubber tape to insure its remaining in position over the ends of the conductors.

There have been many splice connectors developed which have been unsatisfactory for various reasons. More frequently the objection has been that they do not provide a good electrical connection between the conductors and often the element used for connecting the conductors together at the spliced joint becomes dislodged in use.

An object of this invention is to provide an improved splice connector and insulator which is easy to apply and will insure a permanent connection, and a further object of this invention is to insure an insulated covering for the connection which will remain permanently in position.

In accordance with my invention, a splice cap and insulator therefor are provided for connecting two electrical conductors together. Frequently in making the connections to a lighting fixture or in a junction box, it is necessary to connect together the ends of two electrical conductors. By my invention a splice cap is provided which is inserted over the bared ends of the conductors that are to be connected together and then the splice cap is crimped or swaged to permanently connect the conductors together. A flexible cap of plastic insulating material is then inserted over the splice cap and is secured thereto to prevent its accidental removal. The insulating cap is preferably provided with a large open end that readily passes over the splice cap and the adjoining ends of the insulated conductors. A smaller closed end of the insulating cap engages the splice cap and may be provided with internal projections which engage in the depressions formed by crimping or swaging the cap to the conductors. These projections serve to hold the insulating cap in position over the metal splice cap and any portion of the adjoining conductors which may be bared of insulation. The insulating cap is formed of a plastic material which has elasticity so that it can expand to pass over the cap and the elasticity will provide sufficient resilience to hold the projections of the insulating cap in place in the depressions of the splice cap. In a modified form of the invention a retaining ring or cap is provided which may be inserted over the small end of the insulating cap and positioned over the depressions in the splice cap to hold the insulating cap in engagement in the depressions of the splice cap. The retaining ring may be formed of either a non-metallic or a metallic material. In one form of the invention the internal projections in the smaller end of the insulating cap are omitted and projections provided on a metallic retaining ring which project the wall of the insulating cap into the projections of the splice cap. When a retaining ring is used, it may be partially assembled to the cap adjacent the small end and then after the splice cap has been secured to the ends of the conductors, the insulating cap and retaining ring may be forced longitudinally on and over the splice cap until the further movement of the insulating cap is stopped by engagement of its end with the end of the splice cap. The retaining ring may then be moved longitudinally until it overlies the depressions of the splice cap and holds the insulating cap in engagement in these depressions.

What I consider to be novel and my invention will be better understood by reference to the following specification and appended claims when considered in connection with the accompanying drawing in which:

Figure 1:
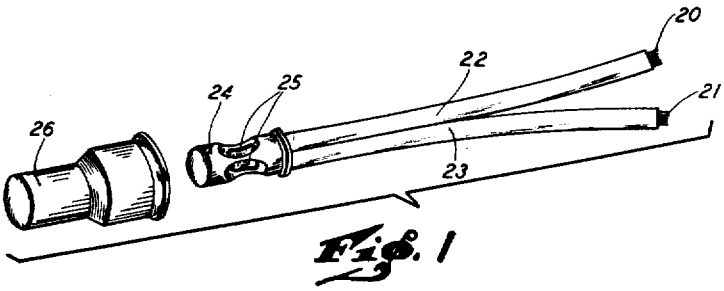
Fig. 1 is an exploded view in perspective showing two conductor ends connected together and an insulating cap therefor.
Figure 2:
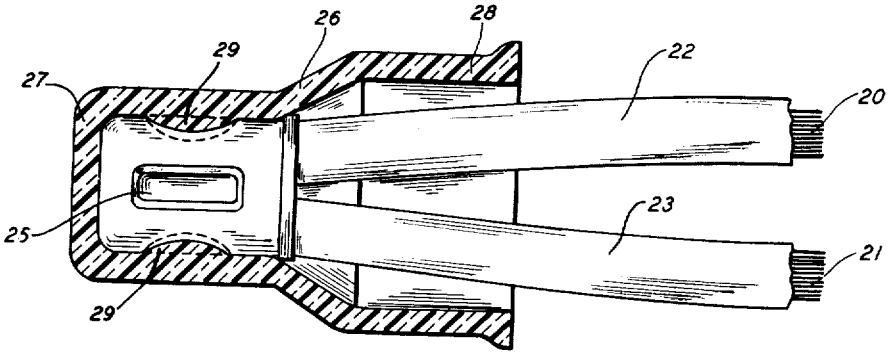
Fig. 2 is an assembled view showing the insulator of Fig. 1 in section.
Figure 3:
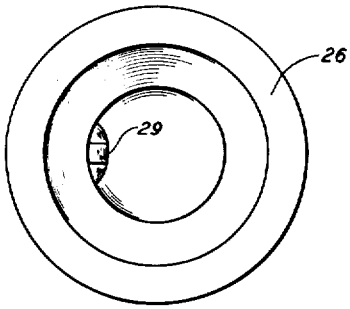
Fig. 3 is an end view of an insulating sleeve having a single positioning projection.
Figure 4:
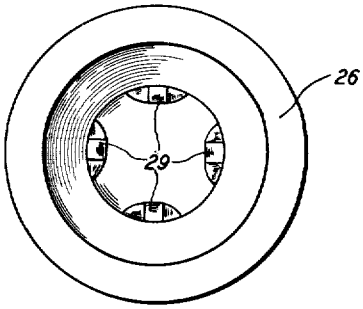
Fig. 4 is an end view similar to Fig. 3 showing a plurality of positioning projections.

Referring to the drawing, 20 and 21 indicate two electrical conductors provided with the usual insulation 22 and 23 respectively. For splicing the two conductors, a metal cap 24 is provided. The ends of the conductors 20 and 21 to be connected together are bared of insulation 22 and 23 at their ends and the ends are then inserted in the cap 24. Thereafter a crimping tool is used for firmly connecting the two conductors 20 and 21 together by deforming the cap 24 at spaced points into engagement with the conductors for insuring a permanent electrical and mechanical connection. The crimping tool also forms a plurality of depressions 25 in the exterior of metal cap 24. An insulating cap 26 is provided as an insulating member over the metal cap 24. As better indicated in Fig. 2, insulating cap 26 is formed with a thin wall having a small end 27 and an enlarged open skirt 28. In the small end 27 positioning projections 29 are provided for engagement in the depressions 25 of metal cap 24 for holding the insulating cap 26 in position. A single projection 29, as shown in Fig. 3, may be used when the cap 26 is formed of material having a substantial rigidity, such as hard rubber. If a very flexible material is used, it is desirable to provide a plurality of projections 29 and, as shown in Fig. 4, four such projections 29 are used. The number of positioning projections 29 which are provided would, of course, be limited by the number of depressions 25 formed in the metal cap 24. The cap 26 must be formed of material providing some resilience to permit the small end with the projections 29 to be inserted on the metal cap 24 and for the projections 29 to be held in position in the depressions 25 of metal cap 24. The enlarged skirt 28 extends beyond the end of splice cap 24 and over the ends of conductors 20 and 21 and their insulation 22 and 23 to insure adequate insulating coverage for the spliced joint.

Figure 5:
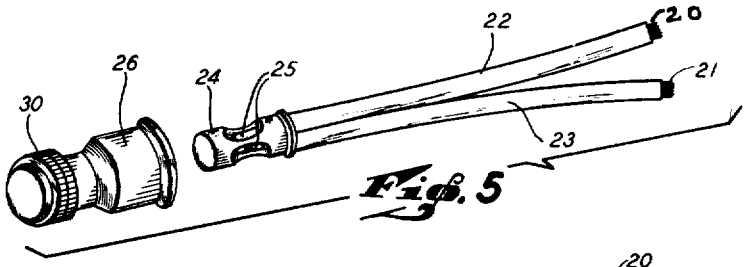
Fig. 5 is an exploded view in perspective showing two conductor ends connected together by a splice cap and an insulating cap and retaining ring shown in position to be inserted on the splice cap.
Figure 6:
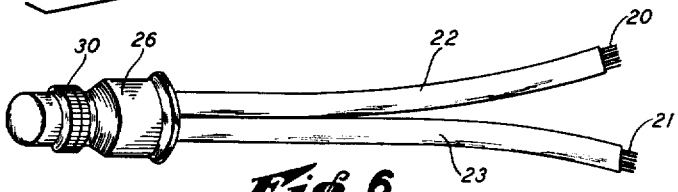
Fig. 6 is a perspective view showing two conductor ends connected together and covered by an insulating cap and a retaining ring.
Figure 7:
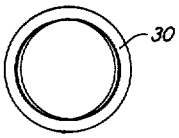
Fig. 7 is an end view of the retaining ring shown in Fig. 6.
Figure 9:
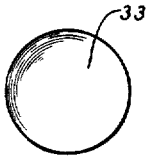
Fig. 9 shows a modified retaining member in the form of a metal cup.
Figure 11:
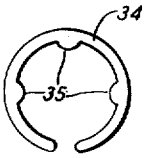
Fig. 11 is a retaining member in the form of a split ring having a plurality of positioning and retaining projections.
Figure 8:
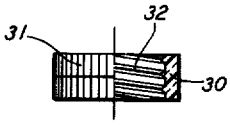
Fig. 8 is an elevation of the retaining ring of Fig. 7 shown partly in section.
Figure 10:
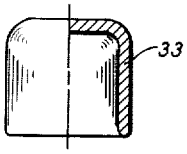
Fig. 10 is an elevation view of the retaining member of Fig. 9 shown partly in section.
Figure 12:
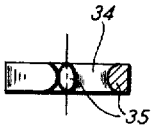
Fig. 12 is an elevation view of the member shown in Fig. 11 shown partly in section.
Figure 13:
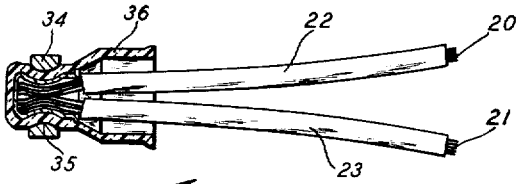
Fig. 13 is a sectional view showing an insulating cap secured to a splice cap by means of the retaining ring shown in Figs. 11 and 12.

In some applications where considerable vibration may be encountered or where large size conductors are connected, it has been found desirable to provide a locking ring to insure the permanent engagement of the projections of the cap 26 in the depressions 25 of the metal cap 24. An annular ring 30 is shown in position over the cap 26 in Fig. 6. The ring 30, as shown, is formed of a plastic material but it may be formed of metal. After the conductors 20 and 21 have been connected together by the metal cap 24, the insulating cap 26 with the ring 30 located at its small end, as shown in Fig. 5, is inserted over the metal cap 24. The ring 30 is then moved toward the open end of the cap 26 until it overlies the location of the positioning projections 29. The ring 30 then serves to prevent the projections 29 from moving radially away from contact with the depressions 25. As better indicated in Figs. 7 and 8, the retaining ring 30 is provided with an exterior knurled surface 31 and a helical thread 32 on its inner surface. The knurled surface 31 on the exterior of the ring 30 provides a gripping surface for movement of the ring. The helical thread 32 projecting inwardly on the ring 30 reduces the area of contact between the ring 30 and the cap 26 and facilitates the movement of the ring 30 axially of the cap 26. The helical thread 32 is desirable when the ring 30 is formed of a flexible plastic material because of the relatively high friction that there may be between the ring 30 and the cap 26. However, if the ring 30 were formed of a hard plastic or of metallic material, it would be unnecessary to provide the helical thread 32. A cup-shaped retaining member 33 is shown in Figs. 9 and 10, formed of a metallic material which could be inserted over the small end of the cap 26 for retaining the insulating cap in position on the splice cap 24 in the same manner as the retaining ring 30. In Figs. 11 and 12, a modified form of retaining ring is shown as a split ring 34 formed of metal with positioning projections 35 extending inwardly. A plain insulating cap of flexible material 36, without inwardly extending positioning projections, can be used and the ring 34 when located in position would project the wall of the cap 36 inwardly into engagement in the depressions 25 of the splice cap 24. The metal ring 34 is shown in position with the modified form of cap 36 in Fig. 13.

What is claimed is:

1. An electrical connector of the character described, comprising a hollow cylindrical splice cap, a plurality of electric conductors extending within said splice cap, said splice cap being deformable at spaced points to electrically and mechanically connect said conductors and to provide exterior depressions, a separable resilient insulating member extending over said splice cap and the ends of said conductors and adapted to be applied over said splice cap after formation of said depressions, said insulating member having a section with a smooth cylindrical outer surface and a retaining member slidable on said section of the insulating member to a position over said depressions where the retaining member forces a portion of said insulating member into firm engagement with said depressions to prevent accidental removal of said insulating member from said splice cap.

2. An electrical connector of the character described comprising a hollow cylindrical splice cap, a plurality of electric conductors extending within said splice cap, said splice cap being deformable at spaced points to electrically and mechanically connect said conductors and to provide exterior depressions, a separable resilient insulating member extending over said splice cap and the ends of said conductors and adapted to be applied over said splice cap after formation of said depressions, said insulating member having a section with a smooth cylindrical outer surface and a plurality of inwardly extending projections engaging the depressions of said splice cap, and a retaining member slidable on said section of the insulating cap to a position over said projections and serving to hold the projections of the cap in engagement with the depressions in said splice cap.

3. An electrical connector as set out in claim 1 wherein said retaining member is provided with at least one inwardly extending projection for forcing said portion of the insulating cap into a depression in said splice cap.

4. An electrical connector as set out in claim 2 wherein said retaining member is in the form of a hollow cap having one closed end which further protects the end of said insulating cap.

5. In an electrical connector having a cylindrical metallic splice cap with a cylindrical wall and at least one depression formed in the cylindrical wall thereof, a separate resilient insulating member extending over said splice cap and the ends of said connectors and adapted to be applied over said splice cap after formation of said depression, said insulating member having a section with a smooth cylindrical outer surface, said section having one closed end and at least one projection extending radially from the interior surface adjacent to but spaced from said closed end and adapted to fit into said depression, and a retaining member slidable on said section of the insulating member to a position over said projection and serving to hold the projection in engagement with the depression in said splice cap.

*6. An electrical connector of the character described, comprising a hollow metal splice member, a plurality of bare metallic electrical conductors extending into said splice member through an open end thereof, said splice member being indented inwardly at a place axially spaced from the end of the member opposite to the aforesaid open end thereof to grip said conductors in intimate mechanical and electrical contact with each other and with said splice member and to form at least one external open socket at said place, and a cap member of deformable insulating material covering said splice member, said cap member having an end covering the end of the splice member opposite to the aforesaid open end thereof and further having at least one preformed internal projection spaced from the closed end of the cap member and received in said pocket, whereby to prevent accidental displacement of the cap member from the splice member, the deformable material of the cap member permitting application or removal of the cap member by relative axial sliding movement between said members and snap action of an internal projection on said cap member into or out of a socket in said splice member.*

*7. An electrical connector of the character described, comprising a hollow metal splice member, a plurality of bare metallic electrical conductors extending into said splice member through an open end thereof, said splice member being indented inwardly at a plurality of peripherally spaced places each axially spaced from the end of the member opposite to the aforesaid end thereof to grip*

*said conductors in intimate mechanical and electrical contact with each other and with said splice member and to form a plurality of externally open sockets peripherally spaced from each other and each axially spaced from the last mentioned end of said splice member, and a cap member of deformable insulating material covering said splice member, said cap member having an end covering the end of the splice member opposite to the aforesaid open end thereof and further having a plurality of preformed internal projections peripherally spaced from each other and axially spaced from the closed end of the cap member and received in said sockets, whereby to prevent accidental displacement of the cap member from the splice member, the deformable material of the cap member permitting application or removal of the cap member by relative axial sliding movement between said members and snap action of said projections into or out of said sockets.*

*8. An electrical connector of the character described, comprising a hollow metal splice member, a plurality of elongated bare metallic electrical connectors extending into said splice member through an open end thereof, said splice member being indented inwardly at a plurality of peripherally spaced places axially spaced from the end of the member opposite to the aforesaid open end thereof to form a series of axially extending slot-like indentations for gripping said conductors in intimate mechanical and electrical line contact with each other and with said splice member and to form a series of axially extending slot-like open sockets peripherally spaced from each other and with*

*each axially spaced from the last mentioned end of said splice member, and a cap member of deformable insulating material covering said splice member, said cap member having an end covering the end of the splice member opposite to the aforesaid open end thereof and further having a plurality of peripherally spaced axially extending preformed internal ribs each spaced from the closed end of the cap member and received respectively in said sockets, whereby to prevent accidental displacement of the cap member from the splice member, the deformable material of the cap member permitting application or removal of the cap member by relative axial sliding movement between said members and snap action of said ribs into or out of said sockets.*

References Cited in the file of this patent or the original patent

UNITED STATES PATENTS

| | | |
|---|---|---|
| 1,700,167 | Kollath | Jan. 29, 1929 |
| 2,276,140 | Andren | Mar. 10, 1942 |
| 2,279,794 | Olson | Apr. 14, 1942 |
| 2,308,286 | Joyce | Jan. 12, 1943 |
| 2,410,321 | Watts | Oct. 29, 1946 |
| 2,429,585 | Rogoff | Oct. 21, 1947 |

FOREIGN PATENTS

| | | |
|---|---|---|
| 235,963 | Germany | June 24, 1911 |

UNITED STATES PATENT OFFICE

CERTIFICATE OF CORRECTION

Reissue No. 24,074 October 18, 1955

Stephen N. Buchanan

It is hereby certified that error appears in the printed specification of the above numbered patent requiring correction and that the said Letters Patent should read as corrected below.

Column 4, lines 34 and 35, for "separate" read -- separable --.

Signed and sealed this 3rd day of January 1956.

(SEAL)
Attest:

E. J. MURRY

Attesting Officer

ROBERT C. WATSON
Commissioner of Patents